United States Patent
Choi et al.

(10) Patent No.: US 6,512,313 B2
(45) Date of Patent: Jan. 28, 2003

(54) ELECTROMAGNETIC X-Y STAGE DRIVER FOR NANO DATA STORAGE SYSTEM AND METHOD FOR FABRICATING COILS OF THE SAME

(75) Inventors: Jae-joon Choi, Seongnam (KR); Kyu-yong Kim, Seongnam (KR); Hong-sik Park, Yongin (KR); Chang-su Park, Yongin (KR); Jong Up Jeon, Suwon (KR)

(73) Assignee: Samsung Electronics Co., Ltd. (KR)

( * ) Notice: Subject to any disclaimer, the term of this patent is extended or adjusted under 35 U.S.C. 154(b) by 30 days.

(21) Appl. No.: 09/877,021

(22) Filed: Jun. 11, 2001

(65) Prior Publication Data

US 2002/0047318 A1 Apr. 25, 2002

(30) Foreign Application Priority Data

Jun. 26, 2000 (KR) .......................................... 00-35333
May 9, 2001 (KR) .......................................... 01-25225

(51) Int. Cl.[7] .................. H02K 33/18; H02K 41/03; H02K 41/02
(52) U.S. Cl. .................. 310/12; 310/13; 310/14; 310/15; 360/294.1; 360/294.2; 360/294.3; 360/294.4; 360/294.5; 360/294.6
(58) Field of Search ........................ 310/12, 13, 14, 310/15; 360/88

(56) References Cited

U.S. PATENT DOCUMENTS 5,908,986 A * 6/1999 Mitamura ............... 73/504.12
6,069,416 A * 5/2000 Chitayat ..................... 310/12
6,130,490 A * 10/2000 Lee ............................ 310/12
6,144,118 A * 11/2000 Cahill ........................ 310/12

* cited by examiner

Primary Examiner—Tran Nguyen
Assistant Examiner—Iraj A Mohandesi
(74) Attorney, Agent, or Firm—Burns Doane Swecker & Mathis, LLP

(57) ABSTRACT

An electromagnetic x–y stage driver for a nano data storage system and a method for fabricating the coils of the same are provided. In the electromagnetic x–y stage driver, a cantilever tip array fixedly provided a medium for recording data to write data to or read data from each cell of the medium. Four coils are formed to be integrated with the medium in front of, behind, to the left of and to the right of the medium to move the medium. Four supporting beam are installed to an x–y stage body onto which a medium structure composed of the medium and the four coils is loaded such that the four supporting beam are connected to the four corners of the medium structure to support the medium structure. Four driving beams connect the upper portions of the supporting beam to the four corners of the medium structure to allow the medium structure to move in an x or y direction. Stiffeners are disposed at the four sides between the supporting beam to prevent the medium structure from rotating. Four pairs of permanent magnets are disposed above and below the four coils so that the four pairs of the permanent magnets correspond to the four coils, respectively. Four yokes are provided so that each of them joins the edges of the upper and lower permanent magnets of each of the four pairs of the permanent magnets to allow the magnetic flux of the permanent magnets to form a closed loop.

7 Claims, 19 Drawing Sheets

STIFFENERS ARE NOT USED

ELECTROMAGNETIC X-Y STAGE DRIVER FOR NANO DATA STORAGE SYSTEM AND METHOD FOR FABRICATING COILS OF THE SAME

BACKGROUND OF THE INVENTION

1. Field of the Invention

The present invention relates to an electromagnetic x–y stage driver for a nano data storage system and a method for fabricating the coils of the same.

2. Description of the Related Art

Recently, the discovery of new microscopic phenomena of various atomic levels or the development of a data storage using a scanning probe microscope has been frequently accomplished. In particular, many magnetic devices using a Micro Electro-Mechanical System (MEMS) have been developed. Such magnetic devices include a magnetic compass, an electromagnetic scanner and an electromagnetic valve.

FIG. 1 is a schematic diagram illustrating a fine positioning apparatus with atomic resolution that is disclosed in U.S. Pat. No. 5,808,302. Referring to FIG. 1, a conventional fine positioning apparatus includes a voice coil motor (VCM) 417 for moving a sample 416 in the z-direction, a VCM 415 for moving a tip 413 in the x-direction and in the y-direction, a direct current (DC) supply 421, a data and control signal bus 424 and a central control unit 420.

The biggest problem of apparatuses using such a conventional fine positioning apparatus is a large amount of power loss. Generally, electromagnetic type apparatuses have large displacement but require large current for this displacement. Since electromagnetic type apparatuses using semiconductor manufacturing technology mostly use a thin coil of several microns through several tens of microns, it is difficult to achieve actuation with large displacement actually due to the large resistance of the coil, and the power consumption is large.

SUMMARY OF THE INVENTION

To solve the above problems, it is an object of the present invention to provide an electromagnetic x–y stage driver for a nano data storage system and a method for fabricating coils for the same, which are essential to development of nano storage devices using the SPM technology and through which coils can be fabricated to have a thickness of several tens to several hundreds of microns, thereby realizing actuation with large displacement and decreasing power loss.

Accordingly, to achieve the above object of the invention, there is provided an electromagnetic x–y stage driver for a nano data storage system. The electromagnetic x–y stage driver includes an x–y stage on which a medium for recording data is mounted; a supporting unit for elastically supporting the x–y stage, the supporting means comprising a plurality of driving beams provided at the corners of the x–y stage; an electromagnetic driver for providing mobility for the x–y stage in a first direction x and a second direction y orthogonal to the first direction x, the electromagnetic driver comprising a plurality of coils formed on the x–y stage and a plurality of permanent magnets for forming magnetic fields across the coils at fixed positions; a cantilever tip array fixedly provided above the medium to write data to or read data from each cell of the medium; and a plurality of stiffeners disposed around the x–y stage to connect the driving beams to each other, the stiffeners preventing the x–y stage from rotating.

In one embodiment, the medium is formed on the top of the x–y stage, and the coils are formed on the bottom of the x–y stage. In another embodiment, the medium is formed at the center of the top of the x–y stage, and the coils are formed around the medium on the top of the x–y stage. The supporting unit includes a supporting beam in the shape of a quadrilateral frame having four corners to which the driving beams are connected, and a stage base contacting the bottom of the supporting beam. Alternatively, the supporting unit includes a plurality of supports connected to the driving beams, respectively, and a stage base at which the supports are installed. Each driving beam includes an x-direction portion extending in the first direction and a y-direction portion extending in the second direction, and each stiffener is connected to a portion at which the x-direction portion meets the y-direction portion. Furthermore, each driving beam includes x-direction portions parallel to each other and y-direction portions parallel to each other so that it has the shape of a quadrilateral frame as a whole.

To achieve the above object of the invention, in one aspect, there is provided a method of fabricating a coil of an electromagnetic x–y stage driver for a nano data storage system. The method includes the steps of (a) forming trenches in a substrate using an Inductively Coupled Plasma Reaction Ion Etching (ICPRIE) method and then forming a passivation layer on the resultant structure using a thermal oxidation process; (b) filling the trenches with a metal; and (c) removing the metal exposed over the trenches using polishing, thereby completing a coil realized as the metal filling the trenches.

Preferably, the step (b) is performed using an electroplating method.

In another aspect, there is provided a method of fabricating a coil of an electromagnetic x–y stage driver for a nano data storage system. The method includes the steps of (a) forming trenches to at least a predetermined depth in a substrate using an ICPRIE method and then forming a passivation layer on the resultant structure using a thermal oxidation process; (b) depositing a metal film on the substrate having the trenches and the passivation layer so that only the top surface of the substrate is coated with the metal film and performing primary electroplating using the metal film as an electrode, thereby forming a first metal layer which does not fill the trenches; (c) etching the rear surface of the substrate to expose the trenches and performing secondary electroplating using the first metal layer as an electrode, thereby depositing a second metal layer to fill the trenches; and (d) polishing and removing the first metal layer, thereby completing a coil.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PRESENT INVENTION

Figure 1:
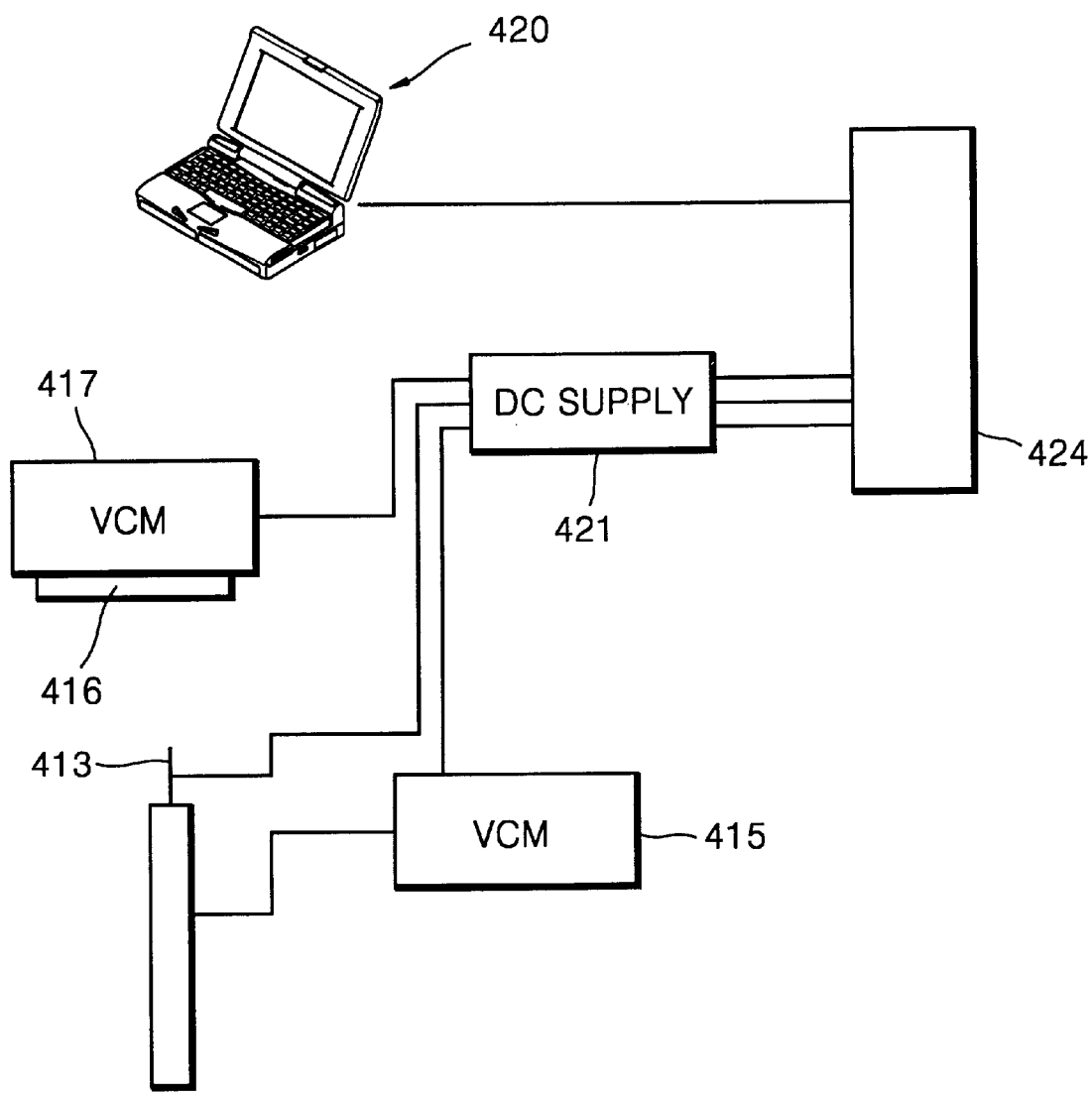
FIG. 1 is a schematic diagram illustrating a fine positioning apparatus with atomic resolution that is disclosed in U.S. Pat. No. 5,808,302.
Figure 2:
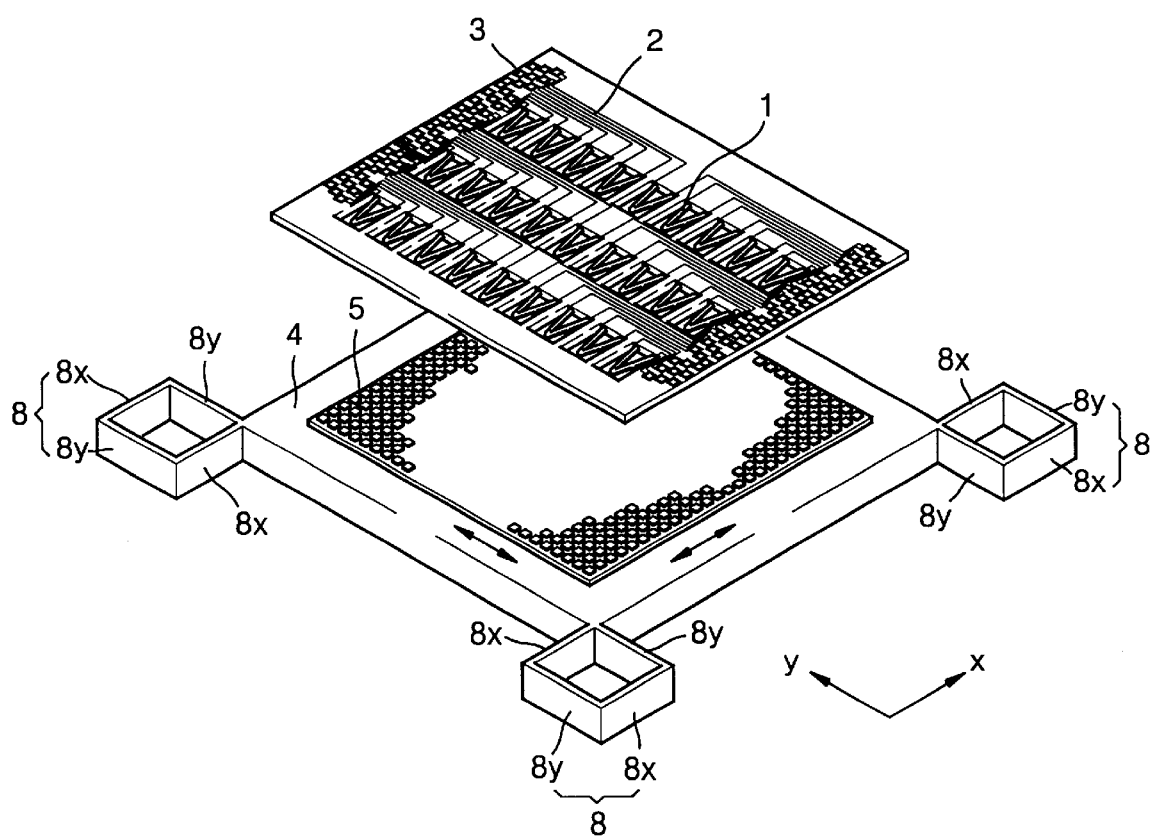
FIG. 2 is a schematic perspective view illustrating the configuration of a nano data storage system having an x–y stage.

Hereinafter, an electromagnetic x–y stage driver for a nano data storage system according to an embodiment of the present invention will be described in detail with reference to the attached drawings. Referring to FIG. 2, a nano data storage system according to the present invention includes a cantilever 1, a metal interconnection 2, a metal pad 3, an x–y stage 4 and a data storage medium 5.

The x–y stage 4 is supported by a plurality of driving beams 8 having portions 8x in an x direction and portions 8y in a y direction. The driving beams 8 functions as springs. The x–y stage 4 is moved in an x–y direction by an electromagnetic driver which will be described later. The driving beams 8 supporting the x–y stage 4 are elastically transformed properly according to the movement of the x–y stage.

A micro tip (not shown) is attached to a front end so that data can be written to or read from the data storage medium 5 provided on the x–y stage 4. The metal interconnection 2 electrically connects the cantilever 1 to the metal pad 3. The metal pad 3 is a terminal which is connected to a circuit (not shown) for writing or reading data. While the data storage medium 5 is being moved in an x direction or in a y direction by the x–y stage 4 which is moved in the x–y direction by an electromagnetic driver, each of the cells (data storage units) of the data storage medium 5 communicates a signal (data) to the circuit through the tip of the cantilever 1. Such an electrical connection structure can be easily implemented by micro electromechanical system (MEMS) technology. Thus, a detailed description thereof will be omitted.

As described above, a relative position between each cell of the data storage medium 5 and the micro tip of the cantilever 1 is controlled by moving the data storage medium 5. It is the x–y stage 4 that moves the data storage medium 5. This x–y stage 4 is driven by an electromagnetic driver which will be described later.

Figure 3A:
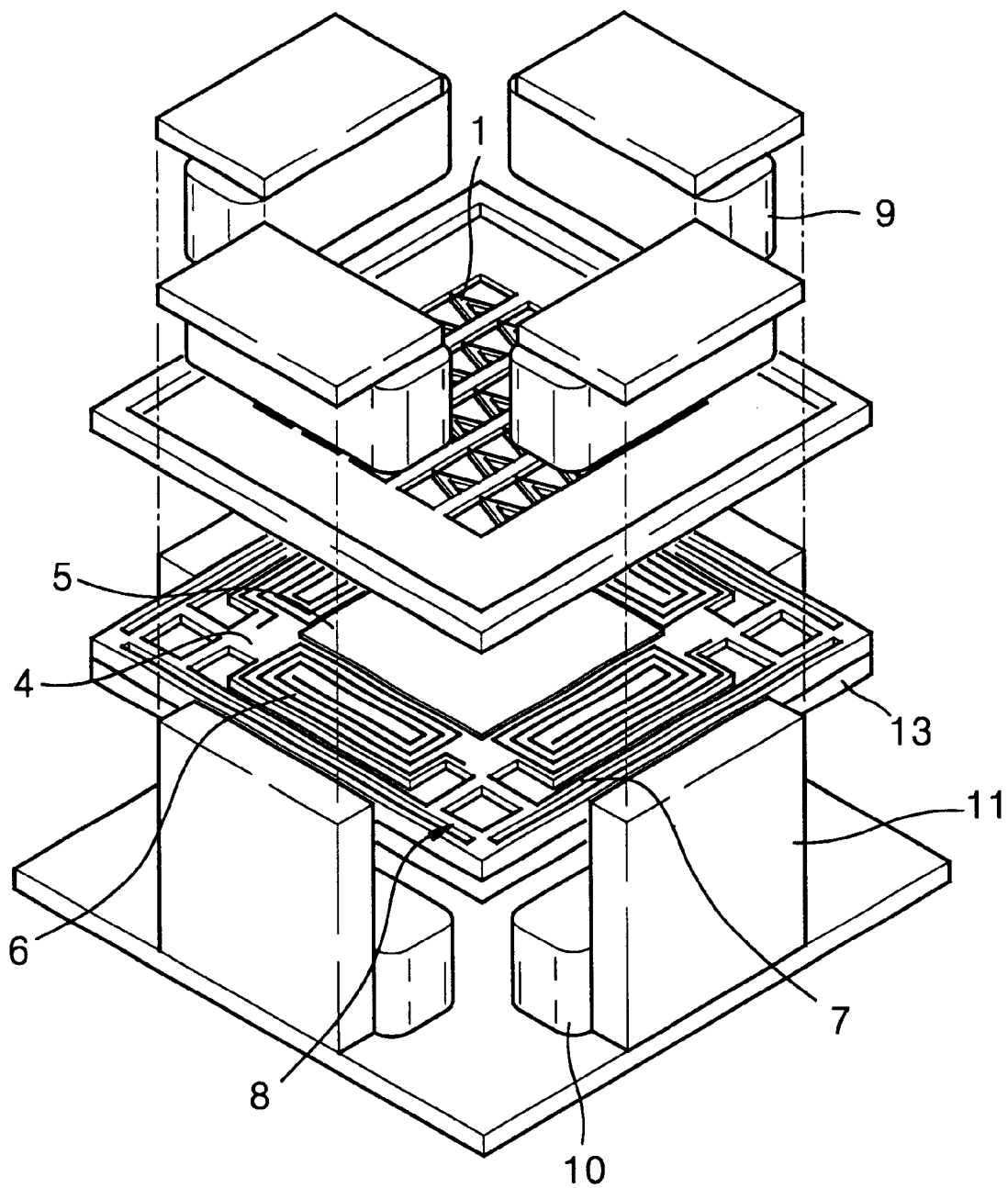
FIG. 3A is a schematic exploded perspective view illustrating an electromagnetic x–y stage driver for driving an x–y stage necessary for the movement of position when data is written to or read from the nano data storage system of FIG. 2 according to a first embodiment of the present invention.

Referring to FIG. 3A, an electromagnetic x–y stage driver according to a first embodiment of the present invention includes coils 6 for moving a data storage medium 5 mounted on an x–y stage 4, four pairs of permanent magnets 9 and 10 positioned above and below the coils 6, yokes 11 for forming a closed loop of the permanent magnets 9 and 10, stiffeners 7 for preventing the x–y stage 4 from rotating, and driving beams 8. Each of the coils 6 can be a type 1 or a type 2 which will be described later.

Figure 3B:
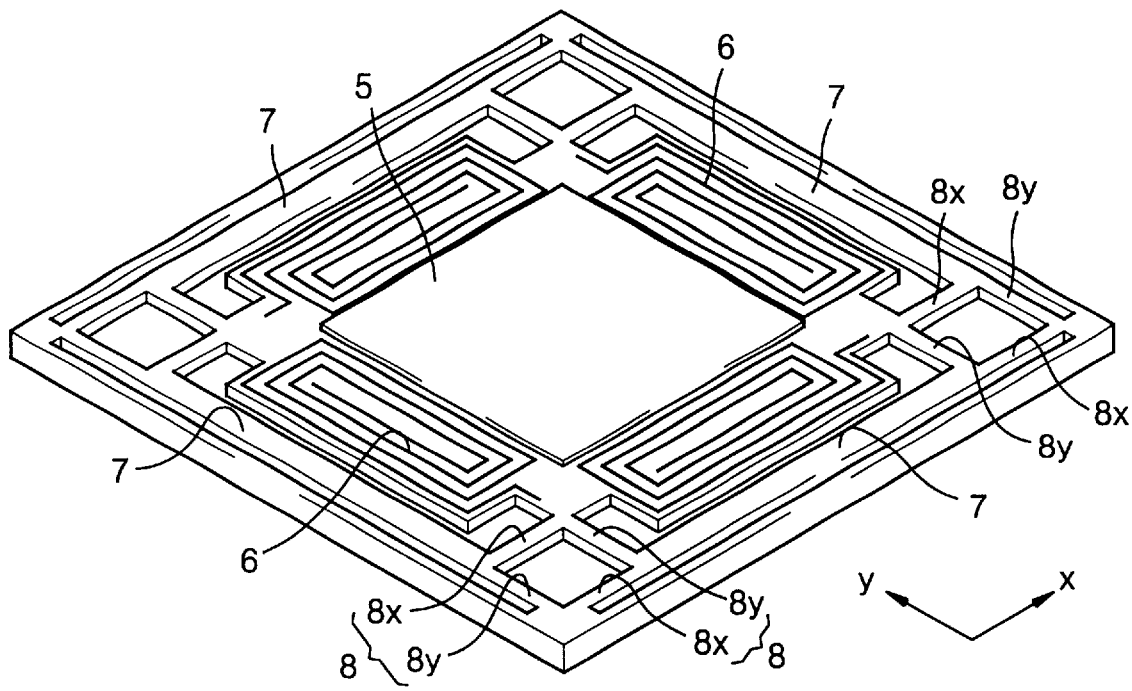
FIG. 3B is a schematic perspective view illustrating an x–y stage applied to the electromagnetic x–y stage driver of FIG. 3A.
Figure 3C:
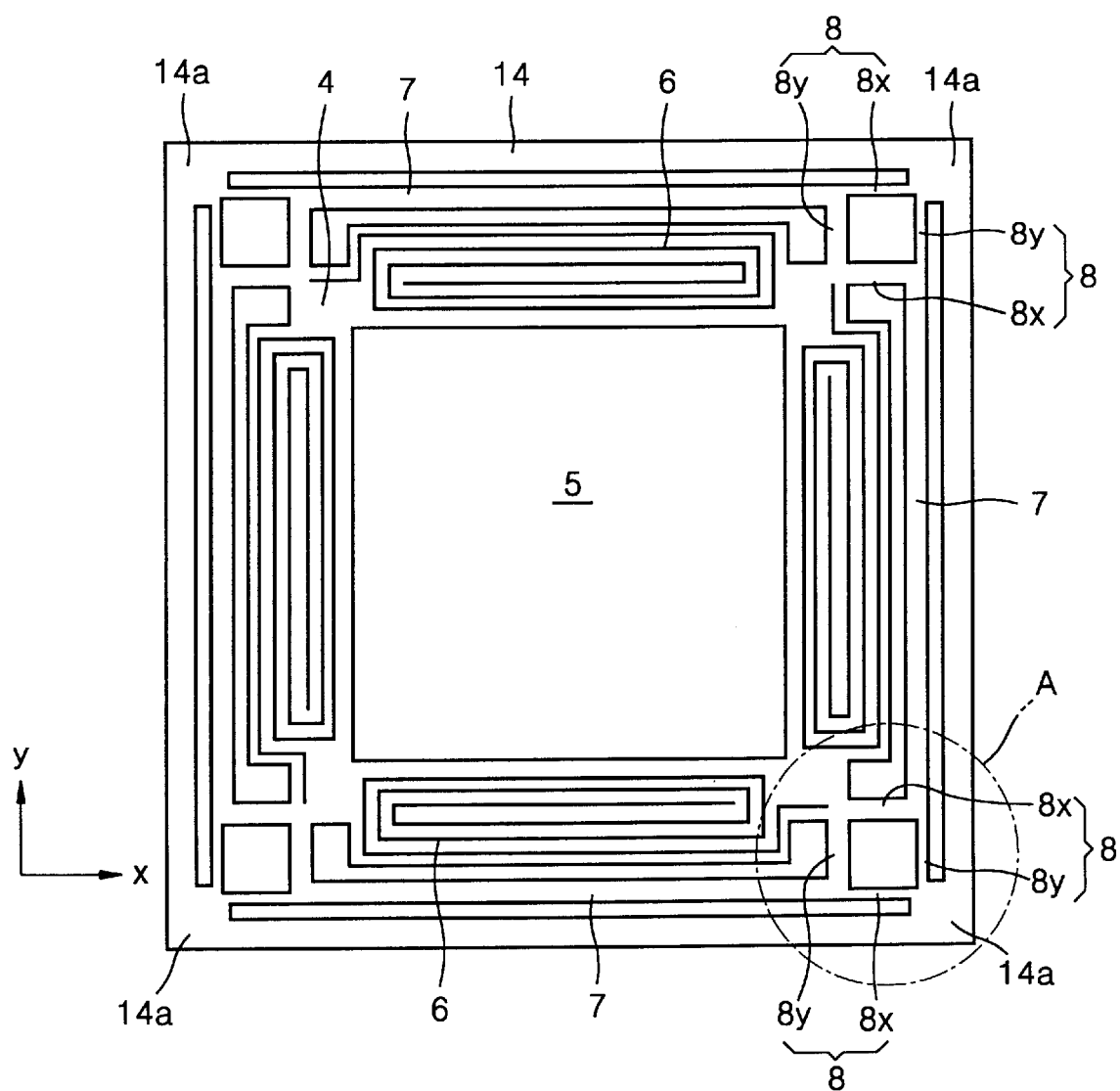
FIG. 3C is a schematic plan view illustrating the x–y stage of FIG. 3B.
Figure 3D:
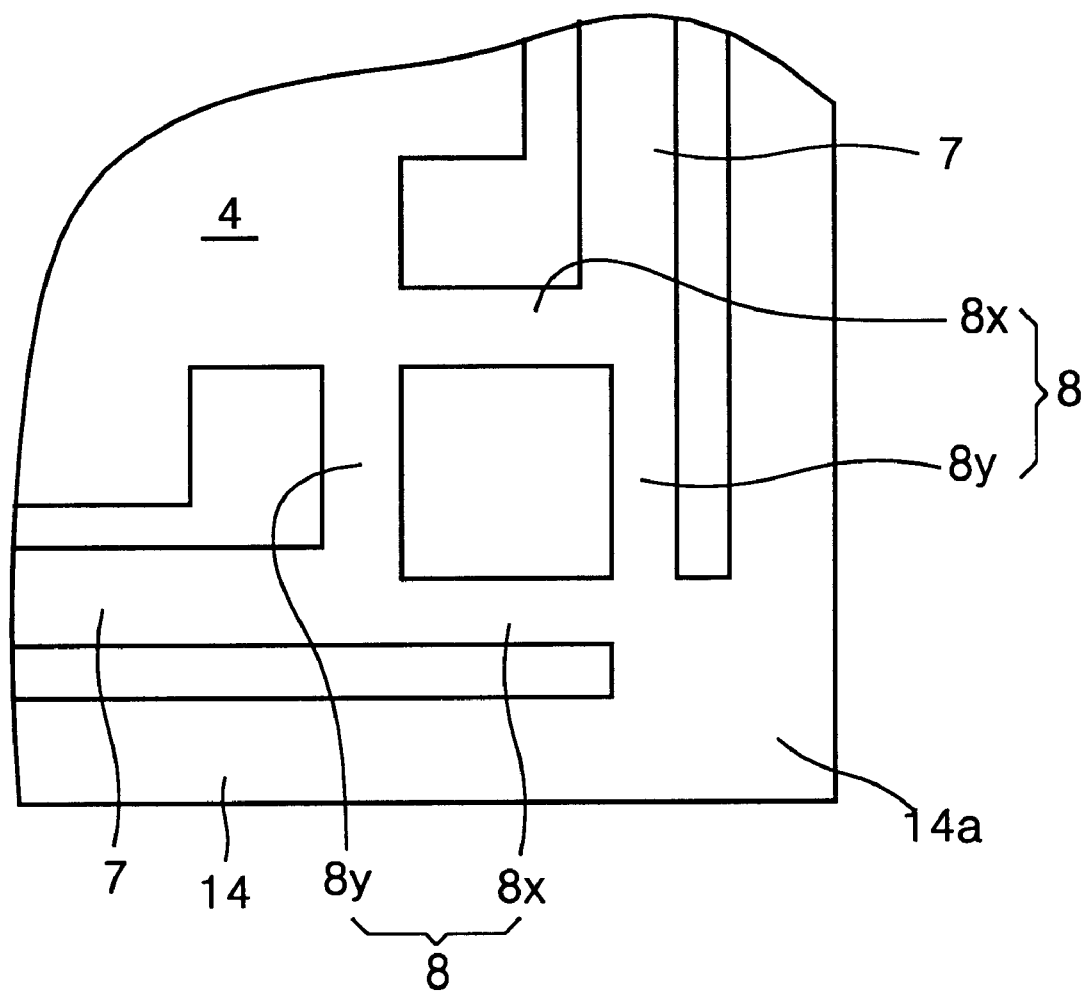
FIG. 3D is a schematic enlarged view illustrating the part A of FIG. 3C.

Referring to FIGS. 3B and 3C, the medium 5 is formed at the center of the x–y stage 4. The coils 6 are formed above, below, on the left side of and on the right side of the medium 5. A supporting beam 14 is formed at the edge of the x–y stage 4 in the shape of a quadrilateral frame. The supporting beam 14 is coupled to a base 13 of FIG. 4A which will be described later. As shown in FIG. 3D, the driving beams 8 having portions 8x in an x direction and portions 8y in a y direction are provided at the four corners of the x–y stage 4, respectively, for supporting the elasticity of the movement of the x–y stage in the x–y direction. The driving beams 8 are connected to the inner sides of the respective corners 14a of the supporting beam 14.

The stiffener 7 are disposed to be parallel to each side of the x–y stage 4 at a predetermined distance therefrom. Either end of each stiffener 7 is connected to a portion at which a portion 8x in the x direction is connected to a portion 8y in the y direction in a driving beam 8.

Figure 4A:
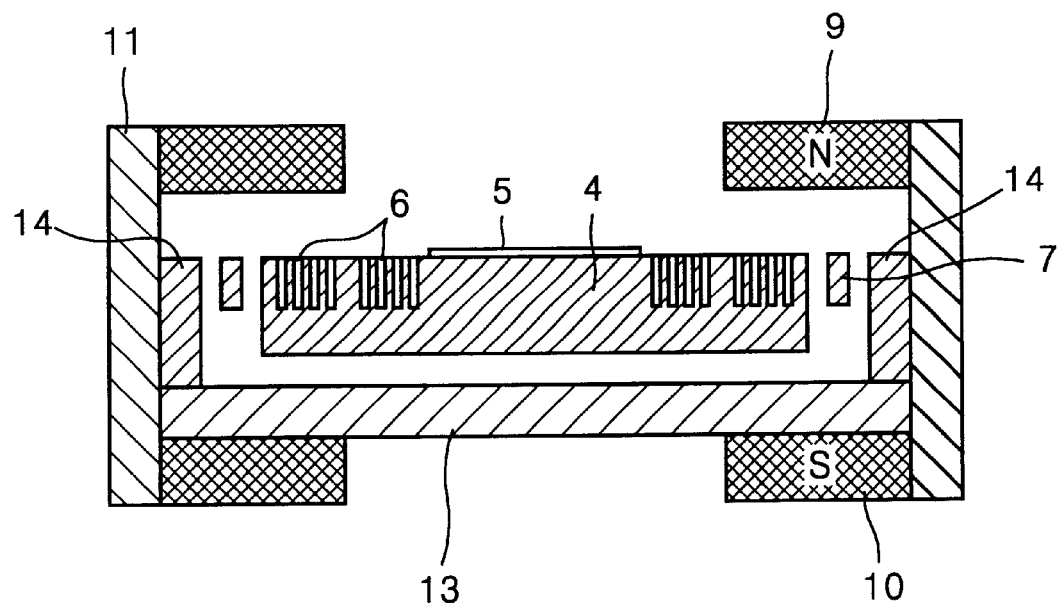
FIG. 4A is a schematic sectional view illustrating the electromagnetic x–y stage driver of FIG. 3A.
Figure 4B:
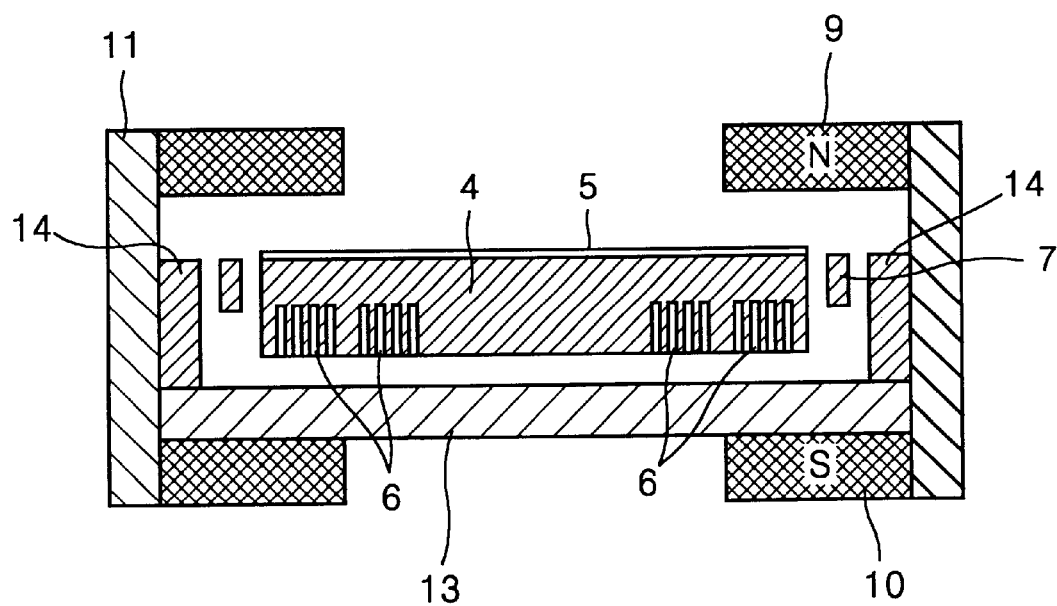
FIG. 4B is a schematic sectional view illustrating an electromagnetic x–y stage driver to which an x–y stage having a medium with an expanded area is applied according to a second embodiment of the present invention.
Figure 4C:
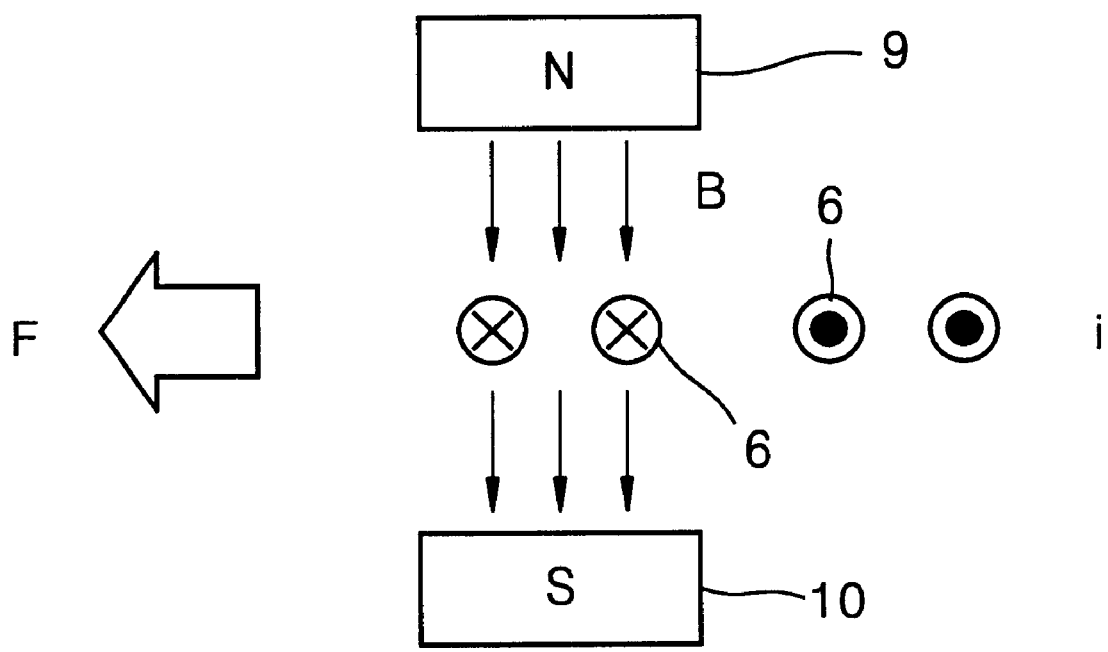
FIG. 4C is a diagram illustrating the principle of driving an electromagnetic x–y stage driver according to the present invention.

Referring to FIG. 4, the medium 5 is mounted on the x–y stage 4 formed of silicon. The x–y stage 4 is supported by the supporting beam 14 of which the bottom contacts the stage base 13 so that it is disposed above the stage base 13 with a gap therebetween. The stiffeners 7, which are provided around the x–y stage 4 and both ends of which are connected to the driving beams 8, are disposed between the x–y stage 4 and the supporting beam 14. The stiffeners 7 prevent the x–y stage 4 from rotating in directions other than the x and y directions.

Referring to FIG. 4B which illustrates an electromagnetic x–y stage driver according to a second embodiment of the present invention, coils 6 for generating mobility for moving an x–y stage 4 in the x–y direction may be formed on the bottom of the x–y stage 4, and a medium 5 to which information is written may be formed on the top of the x–y stage 4. Such a structure allows an information storage capacity to be increased by expansion of the area of the medium 5.

In the above structure, permanent magnets 9 and 10 are disposed, as shown in FIGS. 4A and 4B, such that a magnetic field is formed across half of each coil 6. When current i is applied to the coil 6, Lorentz force F is generated in a direction perpendicular to the current and a magnetic field B due to the magnetic field B formed in a thickness direction of a stage. Due to the Lorentz force F, the x–y stage 4 on which the medium 5 is mounted moves in the x–y direction. When the current is simultaneously applied to the other coil 6 opposite to the above coil 6, double driving force can be obtained. Alternatively, when the current is not applied to the opposite coil 6, the opposite coil 6 can detect the drive of the stage using induced electromotive force generated when driving the stage.

Figure 5A:
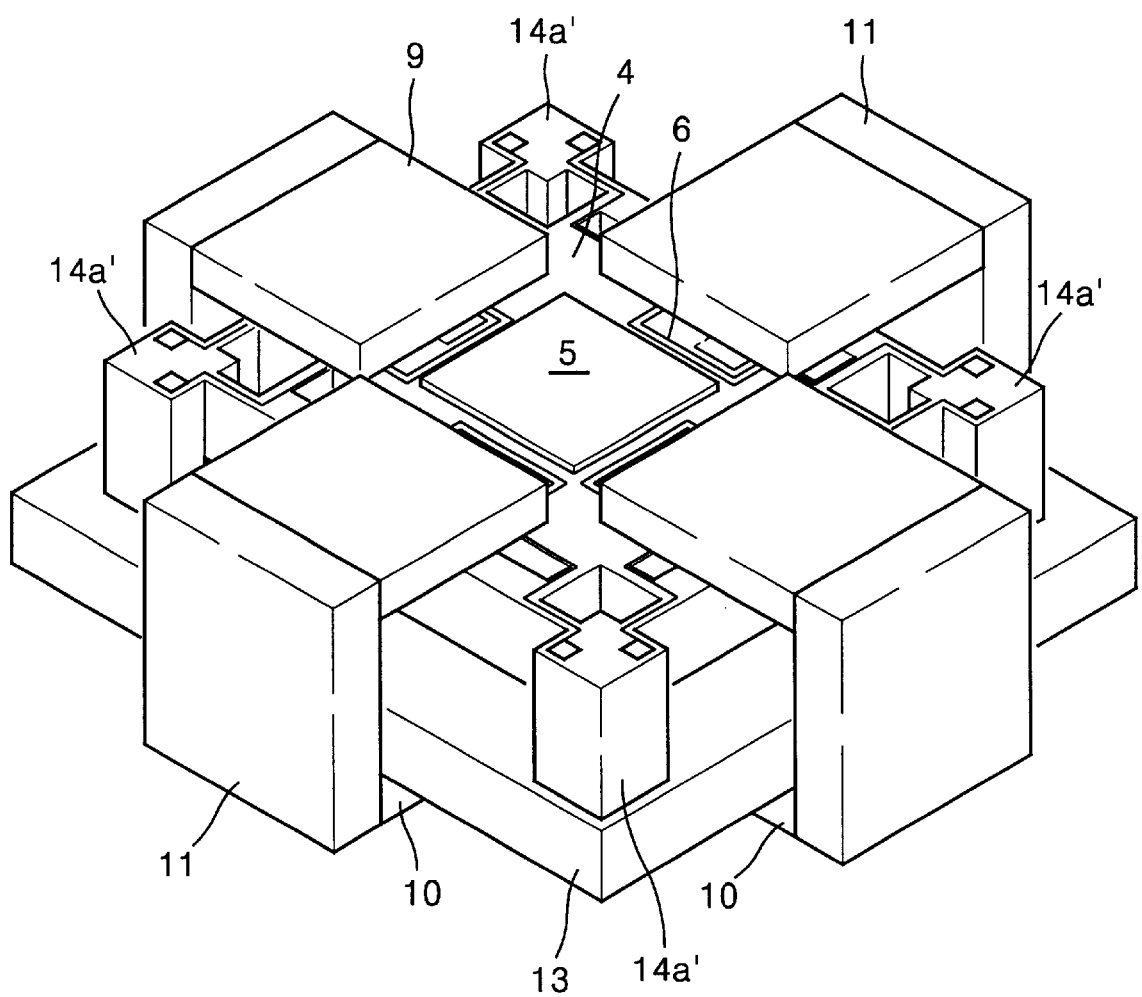
FIG. 5A is a schematic perspective view illustrating an electromagnetic x–y stage driver according to a third embodiment of the present invention.
Figure 5B:
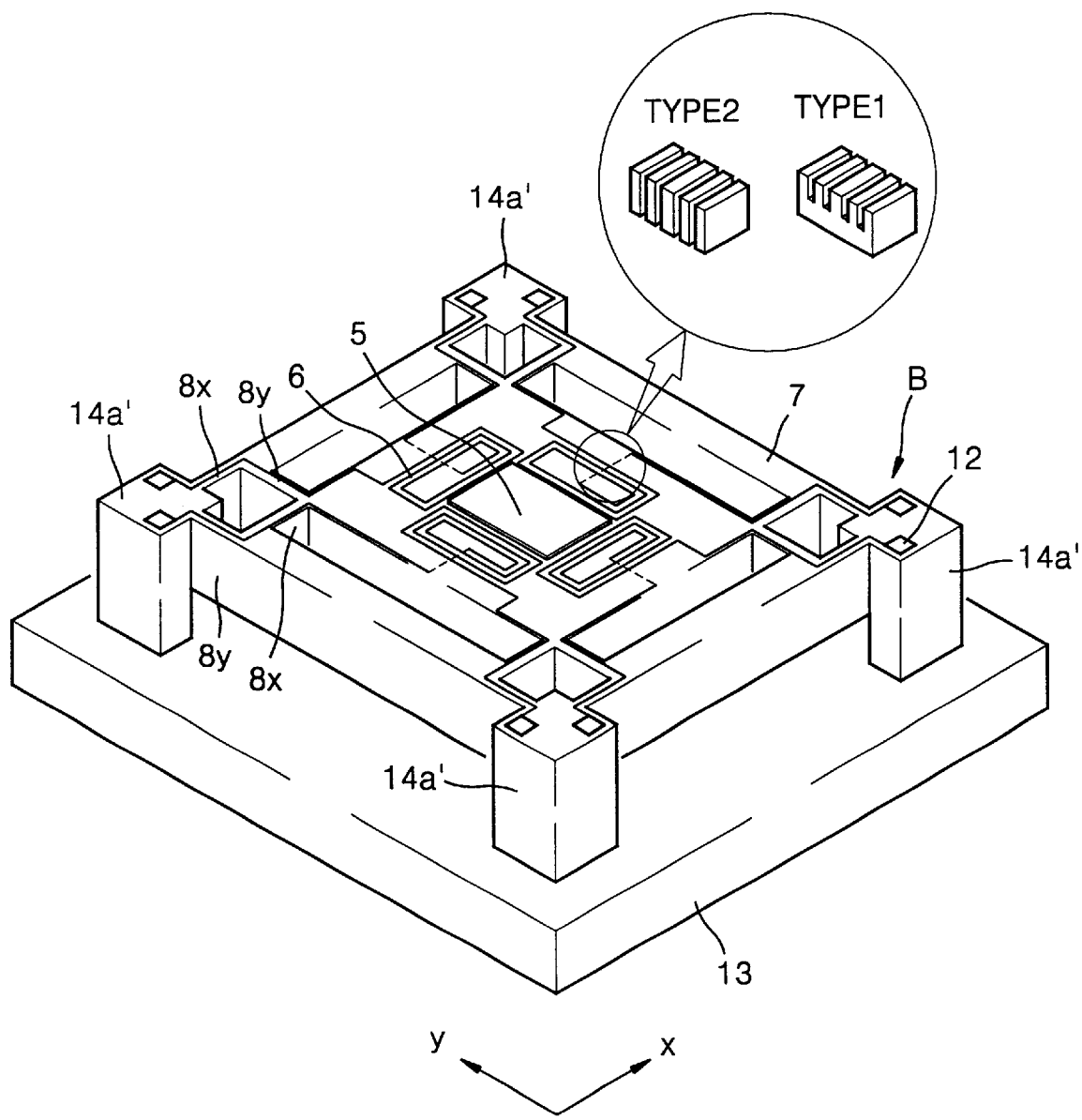
FIG. 5B is a schematic perspective view illustrating an x–y stage applied to the electromagnetic x–y stage driver of FIG. 5A.
Figure 5C:
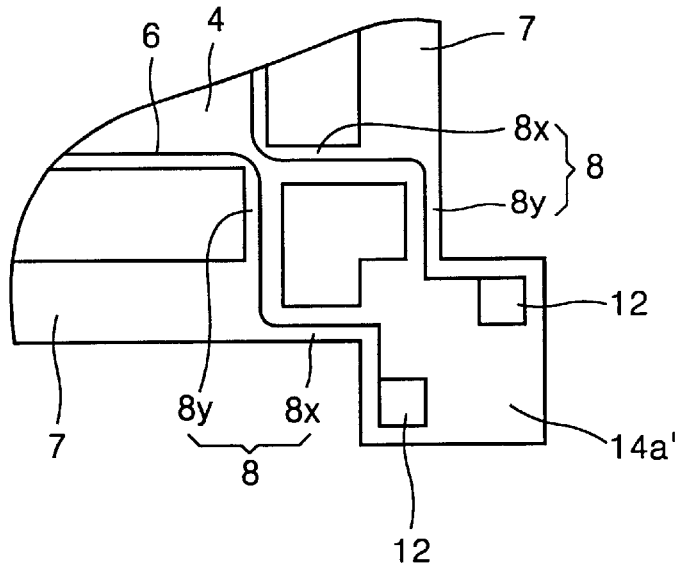
FIG. 5C is a schematic enlarged plan view illustrating the part B of FIG. 5B.

FIG. 5A is a schematic perspective view illustrating an electromagnetic x–y stage driver according to a third embodiment of the present invention. FIG. 5B is a schematic perspective view illustrating an x–y stage applied to the electromagnetic x–y stage driver of FIG. 5A. FIG. 5C is a schematic enlarged plan view illustrating the part B of FIG. 5B.

Referring to FIGS. 5A through 5C, the electromagnetic x–y stage driver does not include the supporting beam 14 that is described in the first and second embodiments, but instead, includes four supports 14a' which are connected to driving beams 8, respectively, at the corners of an x–y stage 4. The supports 14a' correspond to the four corners, respectively, of the supporting beam 14 in the above embodiments. The supports 14a' are fixed on a base 13. Accordingly, the x–y stage 4 is supported by the supports 14a' such that it is disposed above the base 13 at a predetermined distance therefrom. As in the above embodiments, coils 6 formed on the x–y stage 4 can be a type 1 or a type 2 which will be described later. Reference numeral 12 denotes pads or electrodes connected to the coils 6.

In an electromagnetic x–y stage driver having such a structure as described above, the stiffeners 7 is essential for the prevention of rotation of an x–y stage.

Figure 6A:
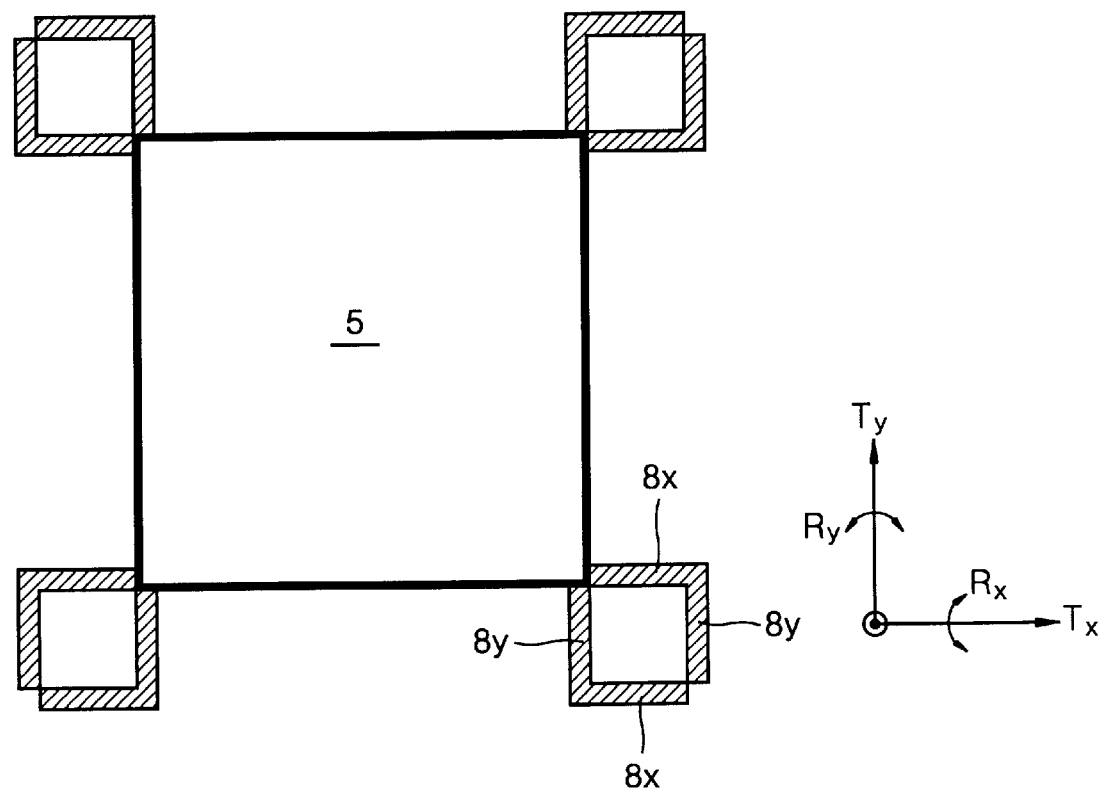
FIGS. 6A through 7 are diagrams illustrating the direction of movement and frequency characteristics of the electromagnetic x–y stage driver of FIG. 3 as the results of analyzing the motion of a medium body by coils when the electromagnetic x–y stage driver has stiffeners and when it does not have stiffeners.
Figure 6B:
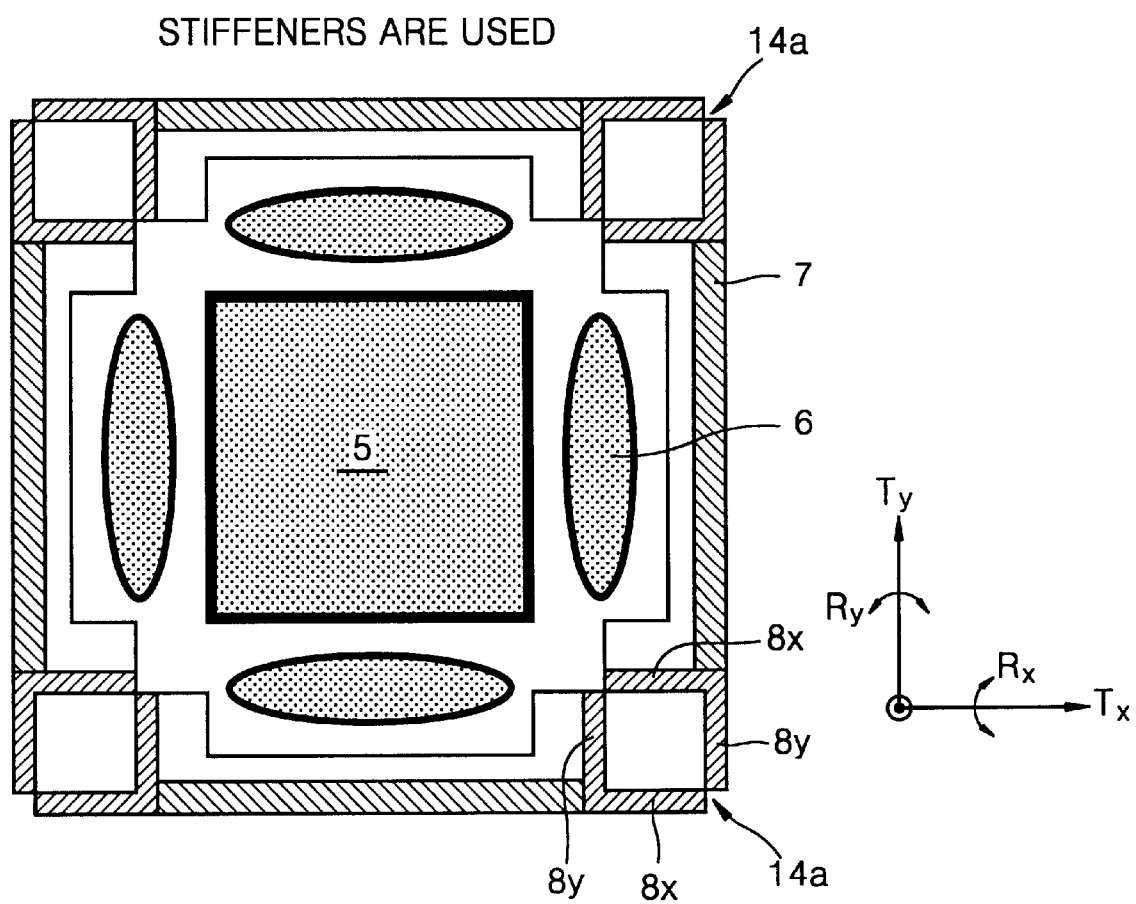
Figure 7:
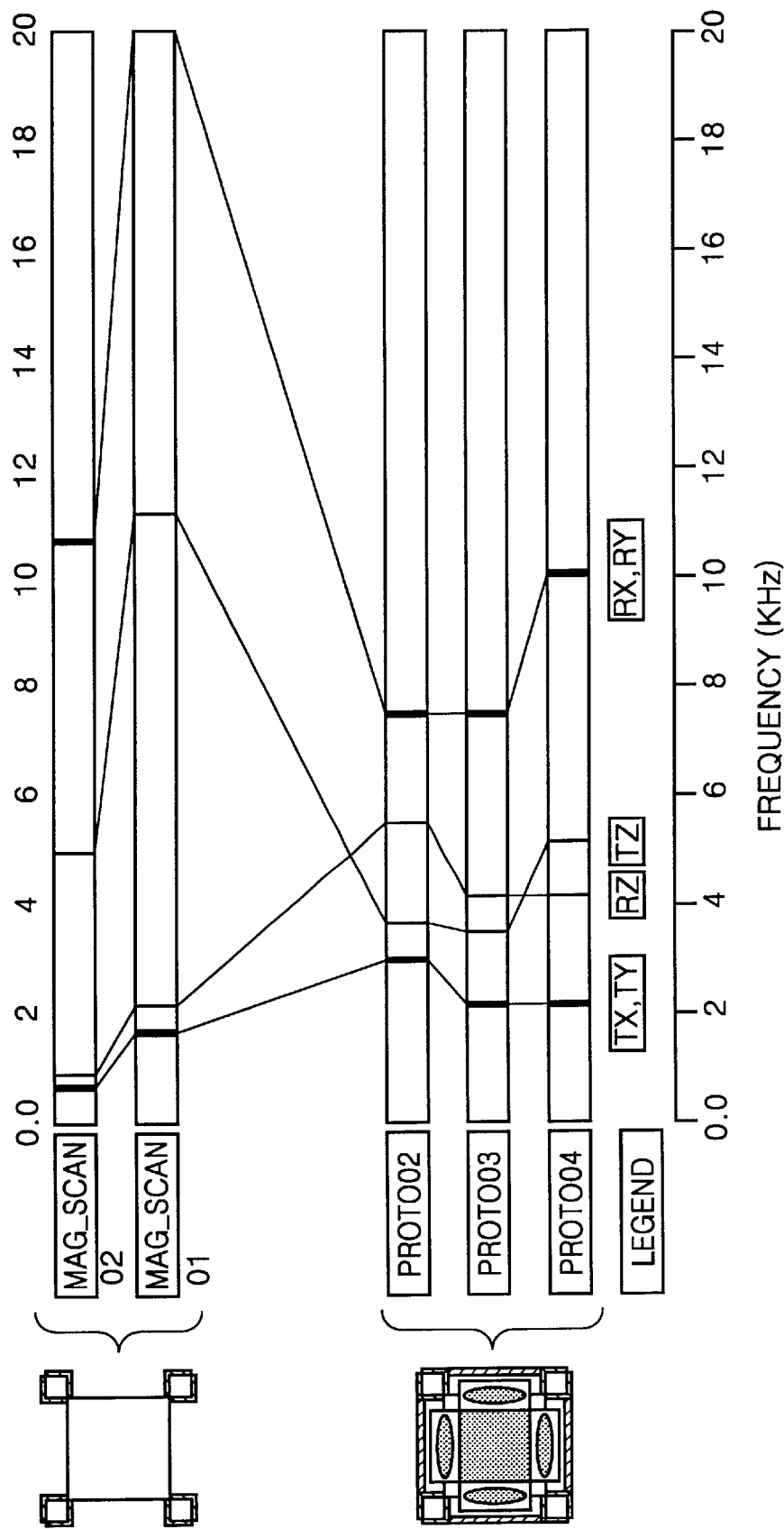

FIGS. 6A through 7 are diagrams illustrating the results of analyzing the motion of a data storage medium body by coils when the electromagnetic x–y stage driver has stiffeners, and the motion of a data storage medium body by coils when it does not have stiffeners. As shown in FIG. 7, by using the stiffeners 7, Rz frequency, that is, a driving mode, can be distinguished from Tx and Ty frequency.

FIGS. 8A through 8D illustrate a method of fabricating a coil of the type 1 among the two types suggested in FIG. 4. The following description concerns a method of fabricating a coil of the type 1.

Figure 8A:
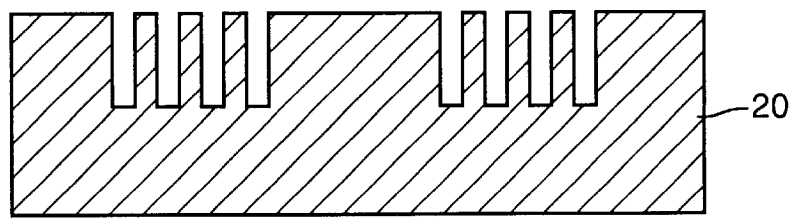
FIGS. 8A through 8D are cross-sectional views illustrating a method of fabricating a coil of the type 1 among the two types suggested in FIG. 4.
Figure 8B:
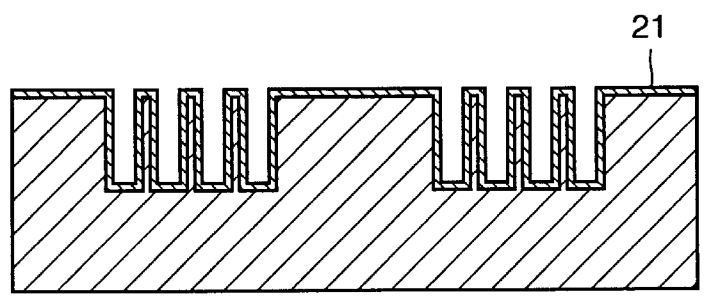
Figure 8C:
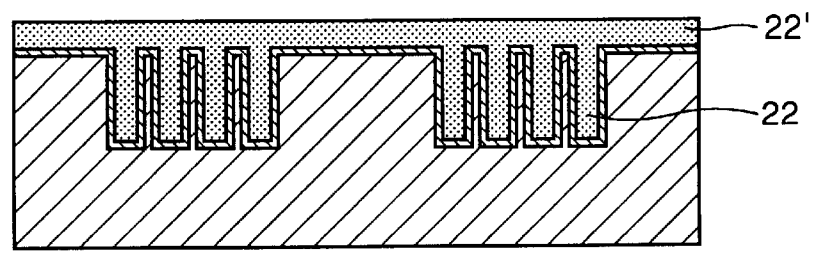
Figure 8D:
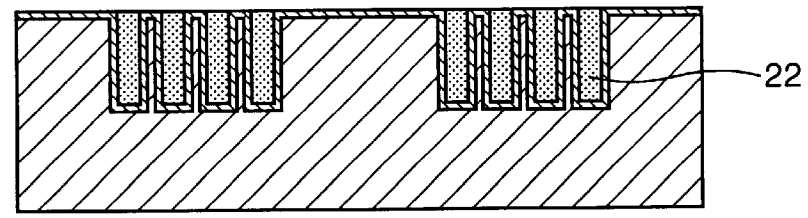

As shown in FIG. 8A, trenches are formed in a substrate 20 using an Inductively Coupled Plasma Reaction Ion Etching (ICPRIE) method or the like. Next, as shown in FIG. 8B, a passivation layer 21 is formed on the resultant structure using a thermal oxidation process. Subsequently, as shown in FIG. 8C, metal is deposited on the resultant structure using a chemical vapor deposition (CVD) method or an electroplating method to fill the trenches, thereby forming metal films 22 and 22'. When using an electroplating method, an electric field is concentrated on the edge of each trench so that the growth rate of a film increases. Since this increase in the growth rate may cause the trench to be blocked, the method is carefully used (it is preferable to change the composition of a plating solution or to use pulse power). Next, the metal film 22' formed over the trenches is removed by polishing, thereby completing a coil 22, as shown in FIG. 8D.

FIGS. 9A through 9F illustrate a method of fabricating a coil of the type 2 among the two types suggested in FIG. 4.

A coil of the type 2 is much thicker than a coil of the type 1. The following description concerns a method of fabricating a coil of the type 2.

Figure 9A:
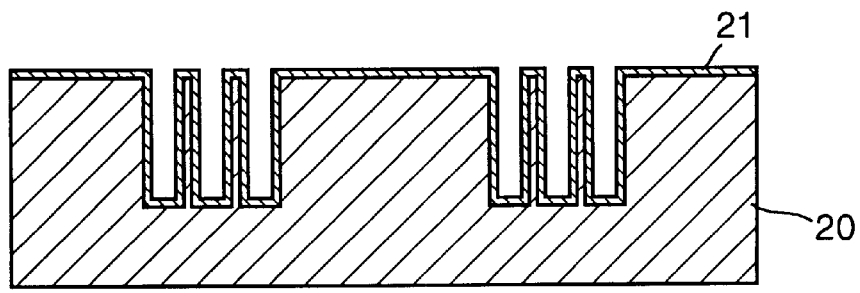
FIGS. 9A through 9F are cross-sectional views illustrating a method of fabricating a coil of the type 2 among the two types suggested in FIG. 4.
Figure 9B:
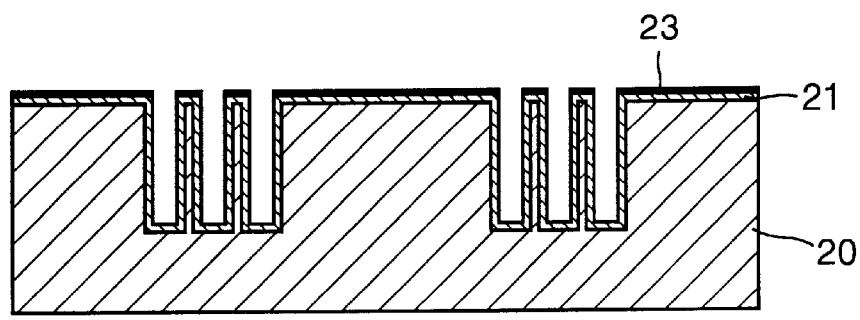
Figure 9C:
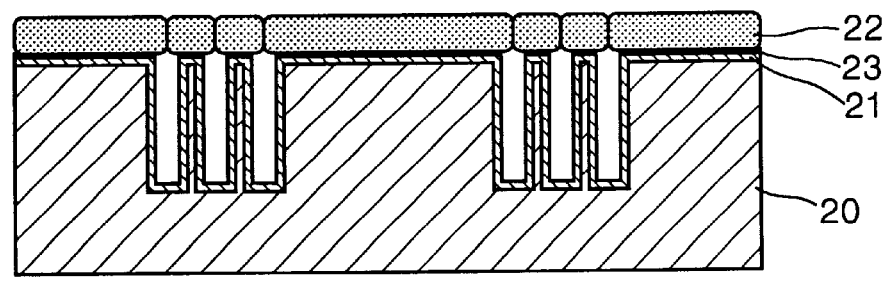
Figure 9D:
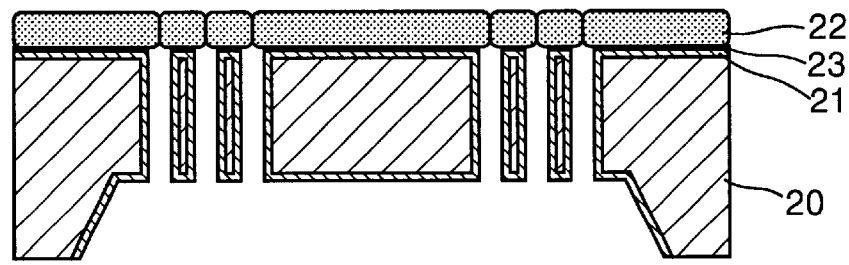
Figure 9E:
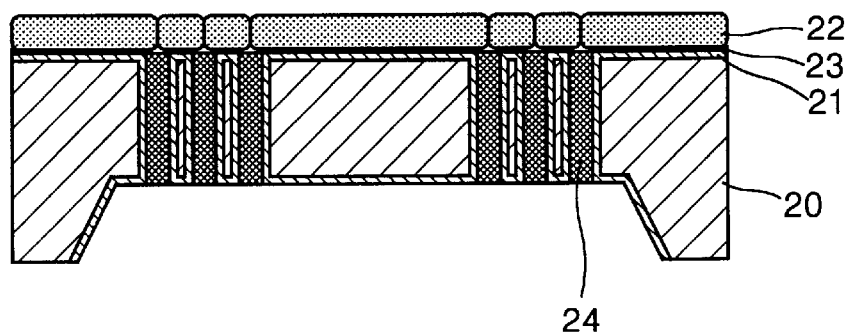
Figure 9F:
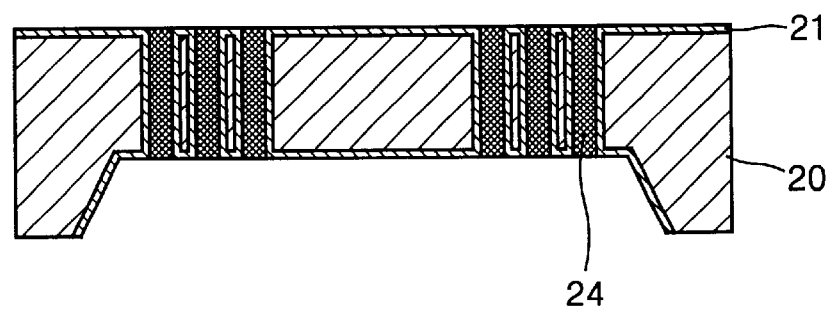

As shown in FIG. 9A, trenches are formed in a substrate 20 using an ICPRIE method or the like, and a passivation layer 21 is formed on the resultant structure using a thermal oxidation process. Here, if the trenches are pierced, a coil having a trench shape cannot be supported, and thus, drops down. Therefore, caution should be exercised not to pierce the trenches. Subsequently, as shown in FIG. 9B, a surface metal film 23 is formed only the top surface of the passivation layer 21. As shown in FIG. 9C, a metal layer 22 is formed by performing primary electroplating using the surface metal film 23 as an electrode. Here, an electric field is concentrated on the edge of each trench, so the growth rate of the metal layer 22 increases. As a result, the trenches are blocked. Next, as shown in FIG. 9D, the backside of the substrate 20 is slightly etched until the trenches are exposed. As shown in FIG. 9E, second electroplating is performed using the metal layer 22 as an electrode so that a metal 24 is deposited in the trenches. Here, the primarily plated metal layer 22 acts as a seed so that the metal 24 fills the trenches. Next, the metal layer 22 is removed by polishing, thereby completing a coil 24, as shown in FIG. 9F.

Figure 10A:
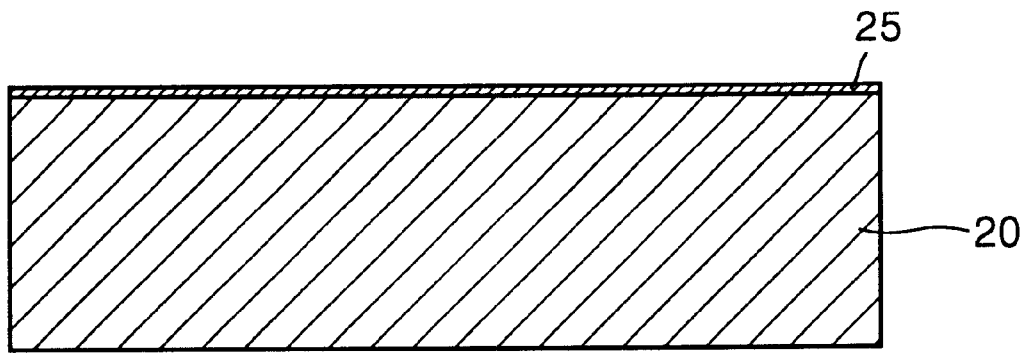
FIGS. 10A through 10D are cross-sectional views illustrating a method of fabricating a thin-film coil (type 3) using existing semiconductor manufacturing technology.
Figure 10B:
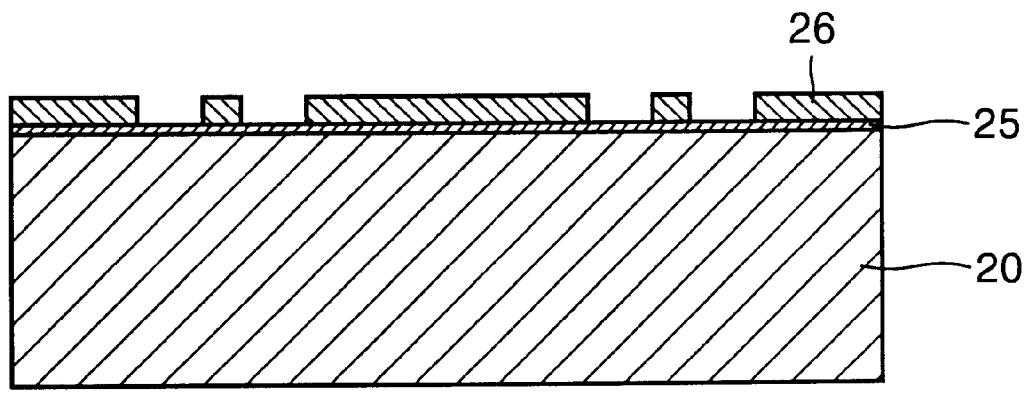
Figure 10C:
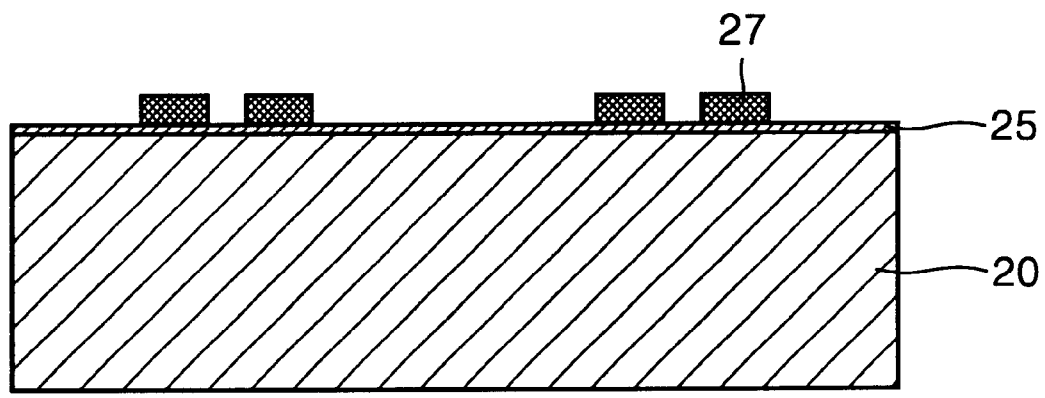
Figure 10D:
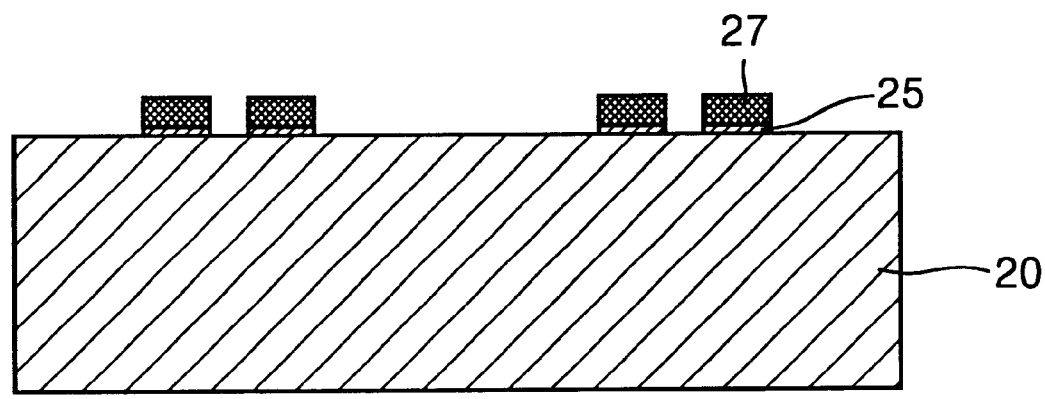

FIGS. 10A through 10D are cross-sectional views illustrating a method of fabricating a thin-film coil (type 3) using conventional semiconductor manufacturing technology. In fabricating a coil of the type 3, as shown in FIG. 10A, a seed metal layer 25 is deposited on a substrate 20. Next, as shown in FIG. 10B, a mask 26 is formed by a photolithography method so that the portion other than an area in which a coil is formed is covered with the mask 26. Subsequently, as shown in FIG. 10C, a metal 27 for the coil is deposited on the exposed portion of the resultant structure by an electroplating method, and then the mask 26 is removed. Next, the exposed seed metal layer 25 is removed, thereby completing a coil 27, as shown in FIG. 10D.

Figure 11:
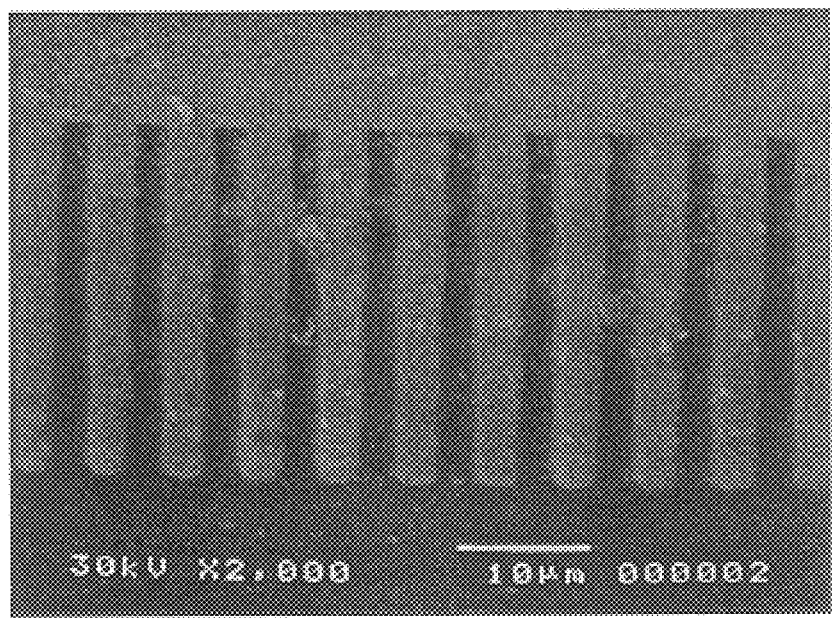
FIG. 11 is a photograph of a coil of the type 1 which was actually fabricated, showing the section of a substrate obtained after the step of FIG. 8C.
Figure 12:
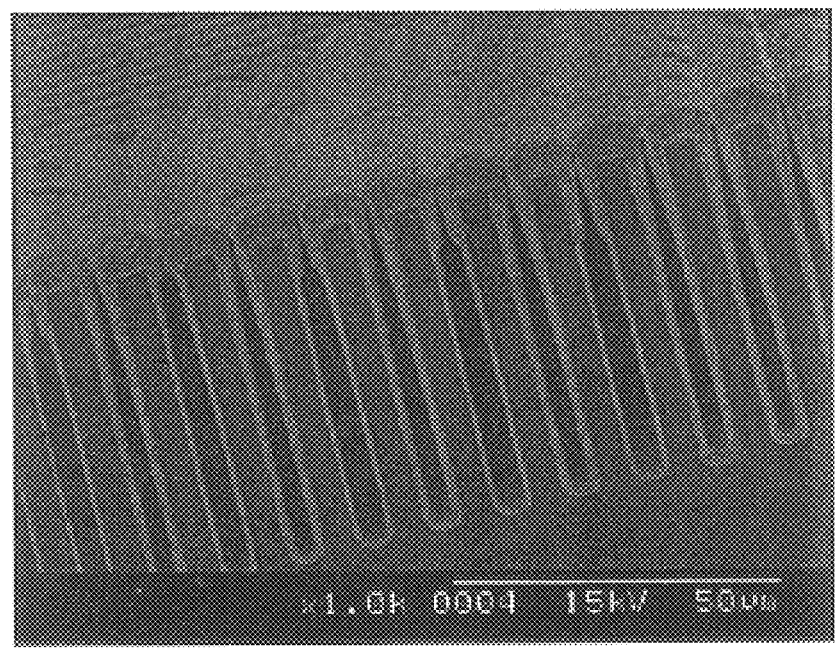
FIG. 12 is a photograph of a coil of the type 2 which was actually fabricated, showing the section of a substrate obtained after the step of FIG. 9C.

FIG. 11 is a photograph of a coil of the type 1 which was actually fabricated. It shows the section of a substrate obtained after the step of FIG. 8C. FIG. 12 is a photograph of a coil of the type 2 which was actually fabricated. It shows the section of a substrate obtained after the step of FIG. 9C.

As described above, in order to write data to or read data from each cell of a data storage medium, in an electromagnetic x–y stage driver for a nano data storage system according to the present invention, a cantilever tip array fixedly provided a medium for recording data to write data to or read data from each cell of the medium. Four coils are formed to be integrated with the medium in front of, behind, to the left of and to the right of the medium to move the medium. Four supporting beam are installed to an x–y stage body onto which a medium structure composed of the medium and the four coils is loaded such that the four supporting beam are connected to the four corners of the medium structure to support the medium structure. Four driving beams connects the upper portions of the supporting beam to the four corners of the medium structure to allow the medium structure to move in an x or y direction. Stiffeners are disposed at the four sides between the supporting beam to prevent the medium structure from rotating. Four pairs of permanent magnets are disposed above and below the four coils so that the four pairs of the permanent magnets correspond to the four coils, respectively. Four yokes are provided so that each of them joins the edges of the upper and lower permanent magnets of each of the four pairs of the permanent magnets to allow the magnetic flux of the permanent magnets to form a closed loop.

According to the present invention, firstly, a thick coil can be fabricated. While a plating solution containing a special additive is necessary for fabricating a coil of the type 1, a much thicker coil of the type 2 can be easily fabricated with a simple plating solution. A method of fabricating coils according to the present invention can solve the problems of power loss and generation of heat in devices requiring coils. Secondarily, a large displacement (100 microns) drive type actuator can be fabricated. According to the present invention, a coil having a thickness of several tens through several hundreds of microns can be fabricated so that the problems described above can be solved.

What is claimed is:

1. An electromagnetic x–y stage driver for a nano data storage system, the electromagnetic x–y stage driver comprising:

an x–y stage on which a medium for recording data is mounted;

supporting means for elastically supporting the x–y stage, the supporting means comprising a plurality of driving beams provided at the corners of the x–y stage;

an electromagnetic driver for providing mobility for the x–y stage in a first direction x and a second direction y orthogonal to the first direction x, the electromagnetic driver comprising a plurality of coils formed on the x–y stage and a plurality of permanent magnets for forming magnetic fields across the coils at fixed positions;

a cantilever tip array fixedly provided above the medium to write data to or read data from each cell of the medium; and a plurality of stiffeners disposed around the x–y stage to connect the driving beams to each other, the stiffeners preventing the x–y stage from rotating.

2. The electromagnetic x–y stage driver of claim 1, wherein the medium is formed on the top of the x–y stage, and the coils are formed on the bottom of the x–y stage.

3. The electromagnetic x–y stage driver of claim 1, wherein the medium is formed at the center of the top of the x–y stage, and the coils are formed around the medium on the top of the x–y stage.

4. The electromagnetic x–y stage driver of claim 1, wherein the supporting means comprises a supporting beam in the shape of a quadrilateral frame having four corners to which the driving beams are connected, and a stage base contacting the bottom of the supporting beam.

5. The electromagnetic x–y stage driver of claim 1, wherein the supporting means comprises a plurality of supports connected to the driving beams, respectively, and a stage base at which the supports are installed.

6. The electromagnetic x–y stage driver of claim 1, wherein each driving beam comprises an x-direction portion extending in the first direction and a y–direction portion extending in the second direction, and each stiffener is connected to a portion at which the x-direction portion meets the y-direction portion.

7. The electromagnetic x–y stage driver of claim 6, wherein each driving beam comprises the x-direction portions parallel to each other and the y-direction portions parallel to each other so that it has the shape of a quadrilateral frame as a whole.

\* \* \* \* \*